US012574947B2

(12) United States Patent
Prasad et al.

(10) Patent No.: US 12,574,947 B2
(45) Date of Patent: Mar. 10, 2026

(54) DOWNLINK CONTROL AND DATA CHANNEL CONFIGURATION

(71) Applicant: Nokia Technologies Oy, Espoo (FI)

(72) Inventors: Athul Prasad, Naperville, IL (US); Volker Pauli, Munich (DE); David Bhatoolaul, Swindon (GB); David Navrátil, Espoo (FI); Naizheng Zheng, Beijing (CN); Ugur Elmali, Munich (DE)

(73) Assignee: Nokia Technologies Oy, Espoo (FI)

( * ) Notice: Subject to any disclaimer, the term of this patent is extended or adjusted under 35 U.S.C. 154(b) by 375 days.

(21) Appl. No.: 18/249,761

(22) PCT Filed: Oct. 23, 2020

(86) PCT No.: PCT/CN2020/123296
§ 371 (c)(1),
(2) Date: Apr. 20, 2023

(87) PCT Pub. No.: WO2022/082745
PCT Pub. Date: Apr. 28, 2022

(65) Prior Publication Data
US 2023/0389050 A1    Nov. 30, 2023

(51) Int. Cl.
*H04W 4/00*        (2018.01)
*H04W 72/30*       (2023.01)

(52) U.S. Cl.
CPC ................................... *H04W 72/30* (2023.01)

(58) Field of Classification Search
CPC ..... H04W 72/30; H04W 72/04; H04W 72/12; H04W 72/50; H04J 2203/0069
See application file for complete search history.

(56) References Cited

U.S. PATENT DOCUMENTS 10,511,941 B2    12/2019    Hong et al.
2010/0246471 A1*    9/2010    Chen ...................... H04W 52/54
370/312
(Continued)

FOREIGN PATENT DOCUMENTS

AU        2018396965 A1    7/2020
CN        101472323 A      7/2009
(Continued)

OTHER PUBLICATIONS

Extended European Search Report received for corresponding European Patent Application No. 20958327.7, dated Jun. 17, 2024, 9 pages.
(Continued)

*Primary Examiner* — Shantell L Heiber
(74) *Attorney, Agent, or Firm* — Lippes Mathias LLP

(57)        ABSTRACT
Embodiments of the present disclosure relate to downlink control and data channel configuration. A method comprises: determining, at a first device, a transmission scheme of control information for a second device based on at least one multicast and broadcast service related criterion, the control information related to scheduling multicast service traffic to the second device; transmitting, to the second device, configuration information for causing the second device to obtain the control information; and transmitting, to the second device and based on the determined transmission scheme, the control information on a control channel between the first device and the second device. In this way, the correlation between the scheduling mechanism of multicast traffic on the downlink data channel and the transmission mechanism of control information on the downlink control channel can be decoupled, resulting in a flexible and dynamic downlink channel configuration and an increased radio resource efficiency.

20 Claims, 3 Drawing Sheets

(56) References Cited

U.S. PATENT DOCUMENTS

| | | | |
|---|---|---|---|
| 2016/0286527 A1 | 9/2016 | Yu et al. | |
| 2017/0347341 A1 | 11/2017 | Zhang et al. | |
| 2018/0048985 A1 | 2/2018 | Park et al. | |
| 2018/0176278 A1 | 6/2018 | Mandyam et al. | |
| 2019/0297607 A1 | 9/2019 | Kim et al. | |
| 2020/0059760 A1* | 2/2020 | Li | H04W 4/06 |
| 2023/0199751 A1* | 6/2023 | Huang | H04W 52/0229 370/329 |

FOREIGN PATENT DOCUMENTS

| | | |
|---|---|---|
| CN | 101640843 A | 2/2010 |
| CN | 103988559 A | 8/2014 |
| CN | 105409299 A | 3/2016 |
| CN | 106559809 A | 4/2017 |
| EP | 3537822 A1 | 9/2019 |
| WO | 2018/143849 A1 | 8/2018 |
| WO | 2019/129212 A1 | 7/2019 |
| WO | 2020/072754 A1 | 4/2020 |
| WO | 2022/082456 A1 | 4/2022 |

OTHER PUBLICATIONS

Office Action received for corresponding Chinese Patent Application No. 202080030920.1, dated Jun. 28, 2024, 12 pages of Office Action and no page of translation available.

"3rd Generation Partnership Project; Technical Specification Group Radio Access Network; NR; NR and NG-RAN Overall Description; Stage 2 (Release 16)", 3GPP TS 38.300, V16.2.0, Jul. 2020, pp. 1-148.

"WID revision: NR Multicast and Broadcast Services", 3GPP TSG RAN Meeting #88-e, RP-201038, Agenda: 9.10.8, Huawei, Jun. 29-Jul. 3, 2020, pp. 1-6.

Alepuz et al., "LTE-Advanced Pro Broadcast Radio Access Network Benchmark", 5G-Xcast, Broadcast and Multicast Communication Enablers for the Fifth-Generation of Wireless Systems, Deliverable D3.1, Version 1.1, Jun. 29, 2018, 140 pages.

"Discussion on PDCCH monitoring reduction during DRX active time", 3GPP TSG RAN WG1 #102-e, R1-2006223, Agenda: 8.7.2, CMCC, Aug. 17-28, 2020, 3 pages.

"3rd Generation Partnership Project; Technical Specification Group Radio Access Network; NR; Radio Resource Control (RRC) protocol specification (Release 16)", 3GPP TS 38.331, V16.1.0, Jul. 2020, pp. 1-906.

"3rd Generation Partnership Project; Technical Specification Group Radio Access Network; NR; Physical layer procedures for control (Release 16)", 3GPP TS 38.213, V16.3.0, Sep. 2020, pp. 1-179.

Kim et al., "LTE network enhancement for vehicular safety communication", Mobile Information Systems, Hindawi, vol. 2017, 2017, pp. 1-18.

"Phase 2 moderator summary on NR Multicast and Broadcast Services", 3GPP TSG RAN WG1 #102-e, R1-200xxxx, Agenda: 8.12, CMCC, Aug. 17-28, 2020, pp. 1-59.

"IEEE 802.11", Wikipedia, Retrieved on May 17, 2023, Webpage available at : https://en.wikipedia.org/wiki/IEEE_802.11.

International Search Report and Written Opinion received for corresponding Patent Cooperation Treaty Application No. PCT/CN2020/123296, dated Jul. 13, 2021, 9 pages.

* cited by examiner

DOWNLINK CONTROL AND DATA CHANNEL CONFIGURATION

FIELD

Embodiments of the present disclosure generally relate to the field of telecommunication and in particular, to methods, devices, apparatuses and computer readable storage media for downlink control and data channel configuration.

BACKGROUND

Wireless communication networks give users of terminal devices (e.g., UE) access to various multimedia contents and services, such as voice, video, packet data, and the like. To deliver content to a recipient, the content provider, such as a base station, may transmit traffic of the content in a unicast, multicast, groupcast, or broadcast manner. Specifically, the unicast technology refers to a point-to-point transmission (PTP) mechanism in which traffic is simply transmitted from the source entity to the destination, for example, a particular UE. Multicast, groupcast, or broadcast refers to a point-to-multipoint (PTM) mechanism in which traffic is sent from the source to a group of user for multicast/groupcast, and all the users for broadcast. In the multicast, groupcast or broadcast scenarios, for example, the evolved multicast broadcast multimedia service (eMBMS) or the single-cell point-to-multipoint (SC-PTM), the traffic can be scheduled to a plurality of UEs by transmission of control information in semi-static or dynamic broadcast manner. For the fifth generation new radio communication network, which may be also referred to as 5G NR, downlink control information (DCI) that is common to a group of UEs or a UE-specific control information to be transmitted on the physical downlink control channel (PDCCH) are proposed for scheduling the multicast traffic and unicast traffic on the physical downlink shared channel (PDSCH), respectively.

In conventional communication systems, the transmission manner of such control information on the PDCCH corresponds to the scheduling manner of multicast traffic on a physical downlink shared data channel (PDSCH). If the traffic is scheduled on the data channel in the unicast manner, i.e., the traffic is scheduled on the PDSCH for a single UE, the related control information is transmitted in a UE-specific manner accordingly. For the traffic scheduled in the multicast manner, i.e., the traffic is scheduled on the PDSCH for a group of UEs, the related control information is transmitted to the group of UEs in a group-common manner, for example, by broadcasting semi-statically. Such a correlated signaling mechanism between the downlink control channel and the downlink data channel leads to an increasing complexity of the UE, especially for the multicast scenario.

SUMMARY

In general, example embodiments of the present disclosure provide a solution for decoupling downlink control and data channels for multicast traffic.

In a first aspect, there is provided a first device. The first device comprises at least one processor; and at least one memory including computer program code; the at least one memory and the computer program code are configured to, with the at least one processor, cause the first device to: determine a transmission scheme of control information for a second device based on at least one multicast and broadcast service related criterion, the control information related to scheduling multicast service traffic to the second device; transmit, to the second device, configuration information for causing the second device to obtain the control information; and transmit, to the second device and based on the determined transmission scheme, the control information on a control channel between the first device and the second device.

In a second aspect, there is provided a second device. The second device comprises at least one processor; and at least one memory including computer program code, the at least one memory and the computer program code are configured to, with the at least one processor, cause the second device to: receive, from a first device, configuration information for causing the second device to obtain control information on a control channel between the first device and the second device, the control information related to scheduling multicast service traffic to the second device; and obtain, from the first device and based on the configuration information, the control information on the control channel.

In a third aspect, there is provided a method. The method comprises: determining, at a first device, a transmission scheme of control information for a second device based on at least one multicast and broadcast service related criterion, the control information related to scheduling multicast service traffic to the second device; transmitting, to the second device, configuration information for causing the second device to obtain the control information; and transmitting, to the second device and based on the determined transmission scheme, the control information on a control channel between the first device and the second device.

In a fourth aspect, there is provided a method. The method comprises: receiving, from a first device and at a second device, configuration information for causing the second device to obtain control information on a control channel between the first device and the second device, the control information related to scheduling multicast service traffic to the second device; and obtaining, from the first device and based on the configuration information, the control information on the control channel.

In a fifth aspect, there is provided a first apparatus. The first apparatus comprises: means for determining a transmission scheme of control information for a second apparatus based on at least one multicast and broadcast service related criterion, the control information related to scheduling multicast service traffic to the second apparatus; means for transmitting, to the second apparatus, configuration information for causing the second apparatus to obtain the control information; and means for transmitting, to the second apparatus and based on the determined transmission scheme, the control information on a control channel between the first apparatus and the second apparatus.

In a sixth aspect, there is provided a second apparatus. The second apparatus comprises: means for receiving, from a first apparatus, configuration information for causing the second apparatus to obtain control information on a control channel between the first apparatus and the second apparatus, the control information related to scheduling multicast service traffic to the second apparatus; and means for obtaining, from the first apparatus and based on the configuration information, the control information on the control channel.

In a seventh aspect, there is provided a non-transitory computer readable medium comprising program instructions for causing an apparatus to perform at least the method according to the above third aspect.

In an eighth aspect, there is provided a non-transitory computer readable medium comprising program instructions for causing an apparatus to perform at least the method according to the above fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
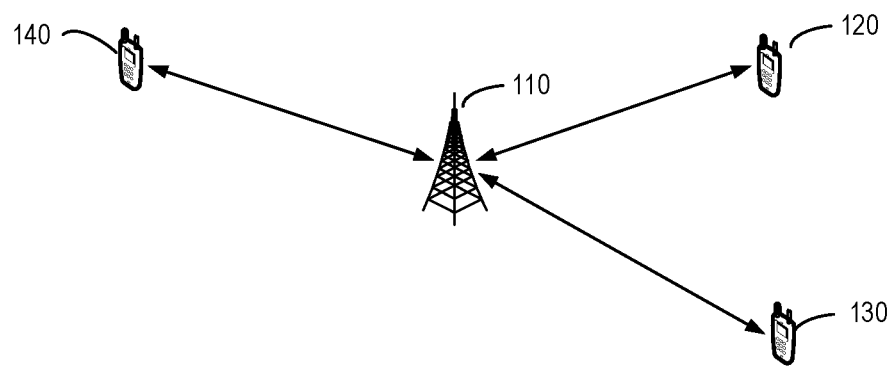
FIG. 1 illustrates an example communication environment in which embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Non-terrestrial network (NTN), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) and the future sixth generation (6G) communication protocols, and/or any other protocols either currently known or to be developed in the future. Embodiments of the present disclosure may be applied in various communication systems, including but not limited to a terrestrial communication system, a non-terrestrial communication system or a combination thereof. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

In legacy communication systems, such as a 4G communication network, the group scheduling mechanisms is supported for broadcasting control information semi-statically or dynamically. For eMBMS and SC-PTM, due to the support for receive-only mode UEs, there are many limitations imposed on the system design, such as, the support for devices that are not registered with the network, support for terminal devices in the idle mode, etc., which have significant impacts in terms of how the multicast data/traffic channel (MTCH) and multicast control channel (MCCH) information is to be transmitted on a physical downlink channel, for example, the PDSCH or the physical multicast channel (PMCH).

As mentioned above, a high correlation between the scheduling manner of the multicast traffic over the downlink shared data channel and the transmission manner of the related control information on the downlink control channel exists in the conventional communication systems. This essentially implies that the data transmission mode over-the-air (OTA)—which could be chosen based on various radio resource efficiency criteria, but should or may not necessarily be a factor in determining how the related control information is transmitted to the UE. Also, high data channel load for scheduling multicast traffic does not imply that the related control information would also consume a significant amount of control channel resources. In other words, such a correlated signaling mechanism between the downlink control channel and the downlink data channel are unnecessary, and may even lead to an increasing complexity of the UE, especially for the multicast scenario.

The network device may configure dynamic uplink hybrid automatic request (UL HARQ) feedback from each UE, which requires the use of UE-specific PDCCH for DCI configurations related to UL feedback, as well as group-common PDCCH for DCI configurations related to multicast PDSCH With the development of 5G NR technologies, the main focus is the behaviors of the terminal device in the radio resource control connected mode (RRC_Connected) mode where the terminal device is connected and tracked by the network which maintains the context of the terminal device, which involves a significant departure from the previous generations. Around this point, improvements in delivery of multicast traffic, downlink data traffic scheduling, control channel enhancements, and related radio resource optimizations are also required. The method proposed in this present disclosure is also applicable the terminal devices in the RRC_Idle or RRC_Inactive mode, whereby the terminal device might have either no active RRC connection or partial RRC connection with the network.

In order to solve the above and other potential problems, embodiments of the present disclosure provide a dynamic scheduling and transmission mechanism for multicast traffic.

FIG. 1 illustrates a schematic diagram of an example communication environment 100 in which embodiments of the present disclosure can be implemented. As shown in FIG. 1, the communication environment 100, which is a part of a communication network, includes a first device 110, a second device, a third device 130 and a fourth device 140. The first device 110 may be a network device, such as, a base station, while the second device 120, the third device 130 and the fourth device 140 may be terminal devices, such as, UEs. In the context of the present disclosure, the second device 120, the third device 130 and the fourth device 140 may be collectively referred to as a group of terminal devices 120 to 140.

The first device 110 may communicate with the group of terminal devices 120 to 140 via respective wireless communication channels between the first device 110 and the group of terminal devices 120 to 140. Control information/data is transmitted on a downlink control channel, such as, the PDCCH, while user data/traffic data is transmitted on a data channel, such as, the PDSCH. For example, the first device 110 may transmit the downlink control information (DCI) on the PDCCH, which include the resource allocation information, the modulation and coding scheme (MCS), the HARQ associated with the PDSCH, and the bandwidth part (BWP) where the traffic is scheduled. Further, the first device 110 can support the MBS and deliver multicast traffic to the group of terminal devices 120 to 140 in a multicast or groupcast manner. By decoding the DCI, the second device 120 may then correctly receive the multicast traffic transmitted on the PDSCH.

As previously mentioned, in conventional communication network, the scheduling mechanism of multicast traffic on the data channel is correlated to the transmission mechanism of control information on the control channel. In the example embodiments, the first device 110 may configure and transmit control information in a flexible and dynamic manner, for example, in a group-common manner or in a UE-specific manner, which will be discussed below in details.

In FIG. 1, the first device 110 and the group of terminal devices 120 to 140 are shown as a base station and UEs, respectively. It is to be understood that embodiments of the present disclosure are also applicable to any other suitable implementations. It is to be understood that the number of devices in FIG. 1 is given for the purpose of illustration without suggesting any limitations to the present disclosure. The communication environment 100 may include any suitable number of network devices and/or terminal devices as well as additional elements not shown adapted for implementing implementations of the present disclosure, without suggesting any limitation as to the scope of the present disclosure.

Communications in the communication environment 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 2:
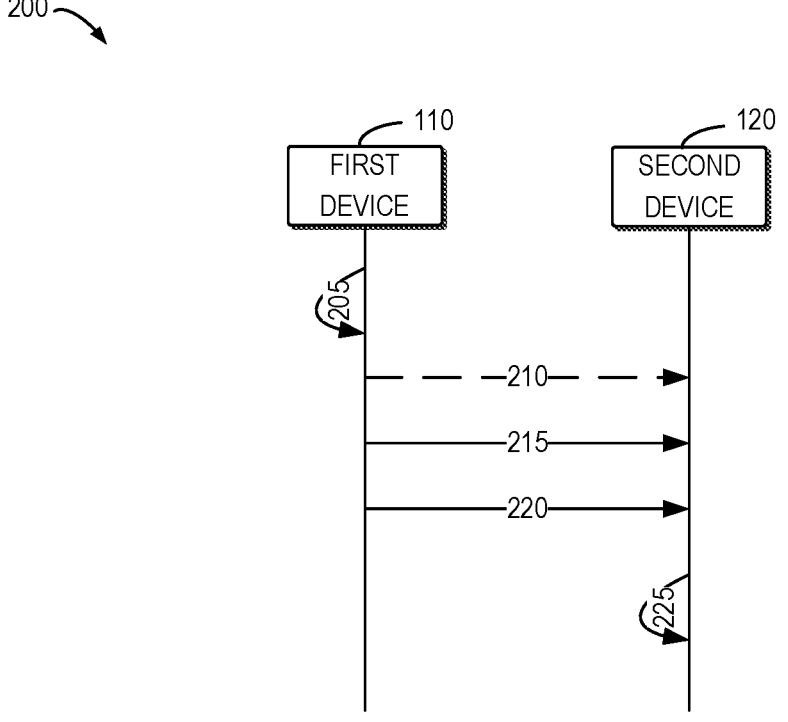
FIG. 2 illustrates a signaling flow for downlink control and data channel configuration in accordance with some example embodiments of the present disclosure.

FIG. 2 illustrates an example signaling chart showing an example process 200 for downlink control and data channel configuration in accordance with some embodiments of the present disclosure. As shown in FIG. 2, the process 200 may involve the first device 110 and the second device 120 as shown in FIG. 1. It is to be understood that the process 200 may include additional acts not shown and/or may omit some acts as shown, and the scope of the present disclosure is not limited in this regard. In addition, it will be appreciated that, although primarily presented herein as being performed serially, at least a portion of the acts of the process 200 may be performed contemporaneously or in a different order than as presented in FIG. 2.

As shown in FIG. 2, the first device 110 determines 205 a transmission scheme of control information for the second device 210 based on at least one MBS related criterion. The control information is related to scheduling multicast service traffic to the second device 120, for example, the DCI transmitted on the PDCCH.

In some example embodiments, the first device 110 may compare a value of a MBS related criterion with a threshold value of the corresponding MBS related criterion. If the value of the MBS related criterion exceeds the threshold value that may be preconfigured or predetermined by the first device, the first device 110 may determine that the control information is to be transmitted in a group-common manner, that is, transmitted on a common set of physical resources allocated for the group of terminal devices 120 to 140. If the value of the MBS related criterion does not exceed the threshold value, the first device 110 may then determine that the control information is to be transmitted in a UE-specific manner, that is, transmitted on an individual set of physical resources allocated for the second device 120. In the following descriptions, the group-common manner and the UE-specific manner may also be referred to as a first transmission scheme and a second transmission scheme of the control information, respectively.

The MBS related criteria may include at least one of a traffic load of the control channel, an uplink feedback configuration requirement, the mobility condition of the second device 120, the radio resource utilization of the control channel, the number of the group of terminal devices 120 to 140 or the BWP of the second device 120. As an example, the traffic load of the control channel, which may include unicast traffic load and other common traffic load related to system information, paging, random access, can indicate the overhead of the downlink control channel for transmission of control information. If the traffic load is significantly high that exceeds a threshold value of traffic load, the first device 110 may transmit the control information in either semi-static manner, such as, semi-persistent scheduling, or broadcast manner, for example, using system information blocks (SIB s) that are configured for the group of terminal devices 120 to 140. If the traffic load of the control channel is medium, the first device 110 may determine to use the second transmission scheme of control information, i.e., scrambling the DCI with the G-RNTI, even in a case that the data channel is not heavily loaded and/or there are no significant benefits from utilizing multicast for the data channel. This could be a situation where the first device 110 has significant amount of URLLC traffic or other types of traffic, which causes significant control channel load, without a significantly impact on the data channel.

As another example, the uplink feedback configuration requirement may be taken into account when the first device 110 determine the transmission scheme of the control information. For example, the first device 110 may configure dynamic UL HARQ feedback from each of the group of terminal devices 120 to 140 by using UE-specific resources on PDCCH for DCI configurations related to UL feedback, as well as group-common resources on PDCCH for DCI configurations related to multicast PDSCH.

If there are a significantly large number of terminal devices configured with the UL HARQ feedback configurations, a total amount of bits and related physical resources, for example, the control channel elements (CCEs) required for UL HARQ feedback may be determined to be an exemplary criterion for determining whether the first transmission scheme or the second transmission scheme to be used.

Another exemplary criterion may be whether the current active BWP of a terminal device (e.g., UE) is the same as the BWP where MBS PDSCH resources are scheduled. In a case where the BWP of the second device 120 is not the same as the BWP where MBS PDSCH resources are scheduled, the second transmission scheme may be selected by the first device 110. This enable the network device (e.g., gNB) to instruct the terminal device (e.g., UE) to switch its BWP, and to configure the multicast MBS PDSCH resources simultaneously on the same DC.

One of the key enhancements in 5G NR for multicast broadcast traffic is a dynamic switch between point-to-point (PTP) and point-to-multipoint (PTM) traffic. For purposes of mobility, a flexible PDCCH configuration enables a seamless mobility for the terminal devices 120 to 140. In the multi-cell scenario or handover or mobility scenarios, the first device 110 may transmit the MBS related criteria via the Xn interface. The MBS related criteria are configurable by the first device 120 and may be weighed depending on their importance. Additionally, or alternatively, in determining the transmission scheme of the control information, more than one threshold value associated with the MBS related criteria can be used.

The first device 110 may determine the transmission scheme per multicast service which may be identified based on different identifiers, such as, the group radio network temporary identifier (G-RNTI) associated with the group of terminal devices 120 to 140 or the single-cell radio network temporary identifier (SC-RNTI) associated with the second device 120. Additionally, or Alternatively, the first device 110 may determine the transmission scheme based on the MBS related criteria per slot, making the scheduling and transmission mechanism more flexible and configurable. It is to be understood that the G-RNTI is given here for illustrative purpose only, and not intended to limit scope of the present disclosure to any particular identifier depicted. Any other form of common identifier used for a particular PTM traffic can be applied.

In a case where the first device 110 determines that the transmission scheme is the first transmission scheme, that is, the control information is transmitted on the individual set of resources for the second device 120, the first device 110 may transmit 210 a first message to the second device 120 for indicating that the control information is transmitted on the individual set of physical resources and the multicast service traffic is transmitted on the common set of physical resources allocated for the group of terminal devices 120 to 140. For example, the first device 110 may transmit the first message via a radio resource control (RRC) signaling. Upon receipt of the first message, the second device 120 may be aware of the transmission scheme.

The first device 110 transmits 215 configuration information to the second device 120 for causing the second device 120 to obtain the control information. The configuration information may be identifier priority information indicative of a prioritized identifier for obtaining the control information. As such, the configuration information may indicate the second device 120 by configuring the C-RNTI and the G-RNTI for blind decoding the DCI information with the same search space index. With the identifier priority information, the first device 110 may indicate that one of the C-RNTI or the G-RNTI with a higher priority is first used for blind decoding the DCI information on the PDCCH and only in case the DCI information is not decoded by using the RNTI with the higher priority will the other RNTI with a lower priority be used for blind decoding the DCI information.

In some example embodiments, the identifier priority information may be included in search space configurations transmitted by the first device 110, either an existing one or a multicast specific search space configuration to be defined in the future. The prioritized identifier may be a 0-2 bit indicator and include one of a common identifier for identifying the group of terminal devices 120 to 140 or a specific identifier for identifying the second device 120. For example, the common identifier may be the G-RNTI and the specific identifier may be the C-RNTI. In a case where the first device 110 may determine to transmit the control information in a legacy manner, the first device 110 may transmit 0-bit identifier priority information to the second device, or alternatively, no identifier priority information is transmitted to the second device 120.

In some example embodiments, the identifier priority information may include a first bit and a value of the first bit indicates whether the common identifier or the specific identifier is prioritized for obtaining the control information. By way of example, the first device 110 may set the value of the first bit of the identifier priority information to be a first value, such as 0, which indicates that the G-RNTI associated with the second device 120 is prioritized for blind decoding the PDCCH. In such cases, the second device 120 may then determine that resources on the PDSCH are scrambled with the G-RNTI based on reciprocity between the control information/PDCCH and the data/PDSCH.

In the above embodiments, the first device 110 may set the value of the first bit of the identifier priority information to be a second value, such as 1, which indicates that the C-RNTI associated with the second device 120 is prioritized for blind decoding the PDCCH.

In some example embodiments, the identifier priority information may include a second bit and a value of the second bit indicates whether the common identifier or the specific identifier is prioritized for obtaining the multicast service traffic scheduled on the data channel, for example, the PDSCH. By way of example, the first device 110 may set the value of the second bit of the identifier priority information to be the first value, such as which indicates that the G-RNTI associated with the second device 120 is used for scrambling the resources on the PDSCH. In such cases, the second device 120 may then descramble the resources with the G-RNTI and obtain the multicast service transmitted on the PDSCH.

In the above embodiments, the first device 110 may set the value of the second bit of the identifier priority information to be the second value, such as 1, which indicates that the C-RNTI associated with the second device 120 is used for scrambling the resources on the PDSCH. In such cases, the second device 120 may then descramble the resources with the C-RNTI and obtain the multicast service transmitted on the PDSCH. Table 1 below shows the example configuration of the identifier priority information as described.

TABLE 1 example configuration of the identifier priority information

| Bits | Value | Descriptions |
|------|-------|--------------|
| 0 | NULL | Legacy or non-dynamic transmission scheme of control information is used for PDCCH |
| 1 | 0 | The common identifier (e.g., G-RNTI) is prioritized for blind decoding of PDCCH; and the common identifier is assumed to be used for scrambling of PDSCH. |
| 2 | 10 | The specific identifier (e.g., C-RNTI) is prioritized for blind decoding of PDCCH; and the common identifier (e.g., G-RNTI) is assumed to be used for scrambling of PDSCH. |
| 2 | 11 | The specific identifier (e.g., C-RNTI) is prioritized for blind decoding of PDCCH; and The specific identifier is assumed to be used for scrambling of PDSCH. |

Alternative configuration of the identifier priority information is shown in table 2 below.

TABLE 2

| Optional configuration of the identifier priority information | | |
| --- | --- | --- |
| Bits | Value | Descriptions |
| 0 | — | Legacy or non-dynamic transmission scheme of control information is used for PDCCH. |
| 1 | 0 | The common identifier (e.g., G-RNTI) is prioritized for blind decoding of PDCCH; and the common identifier is assumed to be used for scrambling of PDSCH. |
| 1 | 1 | no prioritization is assumed and CRC of PDSCH is always scrambled with the specific identifier (e.g., C-RNTI) for the first transmission scheme. |
| 2 | 00 and 01 | Same interpretation as the case where no. of bits = 1 and value of bit = 0, where the common identifier (e.g., G-RNTI) is prioritized for blind decoding of PDCCH, with reciprocity assumed for PDSCH. |
| 2 | 10 | The specific identifier (e.g., C-RNTI) is prioritized for blind decoding of PDCCH; and the common identifier is assumed to be used for scrambling of PDSCH. |
| 2 | 11 | The specific identifier (e.g., C-RNTI) is prioritized for blind decoding of PDCCH; and the specific identifier is assumed to be used for scrambling of PDSCH. |

In some example embodiments, the first device 119 may determine the mechanism per frame. By adjusting the slot position and periodicity of the search space set configurations within a frame, different transmission scheme may be enabled. Specifically, the first device 110 may transmit the search space configurations including the identifier priority information in a set of slots for indicating whether the common identifier or the specific identifier is prioritized for obtaining the control information. By way of example, the first device 110 may transmit the search space configurations in odd slots of a certain periodicity or duration, indicating that the common identifier (e.g., the G-RNTI) is prioritized for obtaining the control information. Additionally, the first device 110 may transmit the search space configurations in even slots of a certain periodicity or duration, indicating that the specific identifier (e.g., the C-RNTI) is prioritized for obtaining the control information. Such rules may be pre-configured at both the first device 110 and the second device 120, or alternatively transmitted to the second device 120 from the first device 110.

The first device 110 transmits 220 the control information on the control channel (e.g., PDCCH) based on the determined transmission scheme. The second device 120 obtains 225 the control information on the control channel based on the configuration information. The first device 110 may then transmits the multicast service traffic on the data channel, for example, the PDSCH, based on the control information and the configuration information. For example, the first device 110 may scramble the resources of the PDSCH based on the configurations shown in either table 1 or table 2. The second device 120 may descramble the DCI information transmitted on the PDCCH based on the configuration information, and then receive the multicast service traffic on the PDSCH based on the control information and the configuration information, as described in Table 1 or 2.

It should be understood that the particular implementations and configurations for the identifier priority information are set forth herein for exemplary purpose only. Other implementations and configurations as well as other signaling of message are also possible for the example embodiments of the present application. It should also be understood that the multicast mode is described in the example embodiments as one of the applicable scenarios, without the intention to limit the present disclosure. The solution provided herein can be applied to the broadcast or any other forms of PTM transmission modes.

With the flexible and dynamic mechanism provided in the example embodiments of the present disclosure, the scheduling manner of the multicast traffic over the downlink data channel can be decoupled with the transmission manner of the related control information on the downlink control channel. As a result, the radio resource efficiencies for delivery of multicast traffic can be improved, regardless of unicast, multicast or broadcast. The blind decoding complexity for the terminal device can be reduced, since if only UE-specific PDCCH configurations is configured with the terminal device, there is no need to perform the blind decoding with the G-RNTI in receiving multicast traffic on PDSCH. Furthermore, the solution of the present disclosure can also provide the network device with flexibility for PDCCH configuration of multicast traffic.

Figure 3:
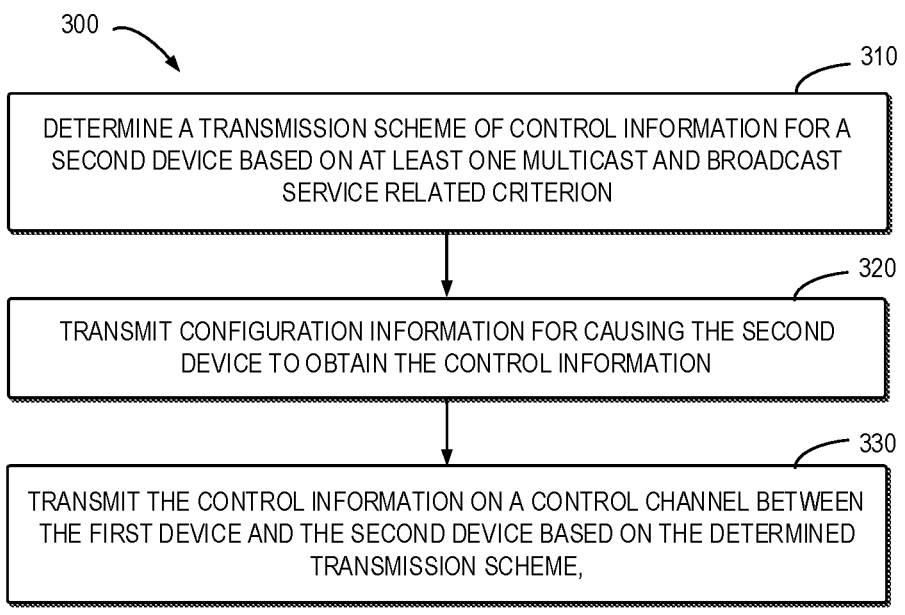
FIG. 3 illustrates a flowchart of a method of communication in accordance with some example embodiments of the present disclosure.

FIG. 3 illustrates a flowchart of a method 300 of communication in accordance with some example embodiments of the present disclosure. The method 300 can be implemented at a network device, e.g., the first device 110 described with reference to FIG. 1. The method 300 may further involve the second 120. It is to be understood that the method 300 may include additional acts not shown and/or may omit some acts as shown, and the scope of the present disclosure is not limited in this regard. In addition, it will be appreciated that, although primarily presented herein as being performed serially, at least a portion of the acts of the process 300 may be performed contemporaneously or in a different order than as presented in FIG. 3.

As shown in FIG. 3, at 310, the first device 110 determines a transmission scheme of control information for the second device 120 based on at least one MBS related criterion. The control information is related to scheduling multicast service traffic to the second device 120. For example, the control information may be the DCI or SIB.

In some example embodiments, the at least one MBS related criterion may include, but not limited to, a traffic load of the control channel, a uplink feedback configuration requirement, mobility conditions of the second device 120, a radio resource utilization of the control channel, the number of a group of terminal devices comprising the second device and so on. It is to be appreciated that other factors can also be taken into consideration in determining the transmission scheme of the control information, the scope of the present disclosure is not limited in this aspect.

In some example embodiments, the first device 110 may compare a value of the MBS related criterion with a threshold value of the corresponding MBS related criterion, which may be preconfigured for the first device. By way of example, if the value of the MBS related criterion exceeds the threshold value of the multicast and broadcast service related criterion, the first device 110 may determine that the control information is to be transmitted on a common set of physical resources allocated for the group of terminal devices 120 to 140 comprising the second device 120. If the value of the MBS related criterion does not exceed the threshold value, the first device 110 may determine that the control information is to be transmitted on an individual set of physical resources allocated for the second device 120.

In a case where the transmission scheme is determined to be a first transmission scheme in which the control information is transmitted on the individual set of physical resources, the first device 110 may transmit a first message indicating the first transmission scheme to the second device 120. For example, the first message may indicates that the control information is transmitted on an individual set of physical resources allocated for the second device 120 and the multicast service traffic is transmitted on a common set of physical resources allocated for the group of terminal devices 120 to 140.

At 320, the first device 110 transmits configuration information to the second device 120. The configuration information causes the second device 120 to obtain the control information. In some example embodiments, the configuration information transmitted by the first device 110 may be identifier priority information that indicates a prioritized identifier for obtaining the control information. The prioritized identifier may include one of a common identifier for identifying the group of terminal devices 120 to 140 which includes the second device 120 or a specific identifier for identifying the second device 120. For example, the common identifier may be the G-RNTI, and the specific identifier may be the C-RNTI.

The identifier priority information may be a 0 to 2-bit indicator. In some example embodiments, the identifier priority information may include a first bit. The value of the first bit may indicate whether the common identifier or the specific identifier is prioritized for obtaining the control information. In some example embodiments, the identifier priority information further includes a second bit. The value of the second bit may indicate whether the common identifier or the specific identifier is prioritized for obtaining the multicast service traffic scheduled on a data channel, for example, the PDSCH.

The identifier priority information may be included in search space configurations transmitted by the first device 110. In some example embodiments, the first device 110 may transmit the search space configurations that include the identifier priority information in a set of slots for indicating whether the common identifier or the specific identifier is prioritized for obtaining the control information.

At 330, the first device 110 transmits, to the second device 120, the control information on the control channel based on the determined transmission scheme. For example, if the transmission scheme is the UE-specific transmission scheme, i.e., the first transmission scheme, the first device 110 may transmit the control information on the individual set of physical resources allocated for the second device 120. If the transmission scheme is the group-common transmission scheme, i.e., the second transmission scheme, the first device 110 may transmit the control information on the common set of physical resources allocated for the group of terminal devices 120 to 140. The first device 110 may then transmit, to the second device 120, the multicast service traffic on the data channel based on the control information and the configuration information.

The method provided in the example embodiments of the present disclosure enables the network device (e.g., gNB) to flexibly and dynamically configure the downlink control and data channels and adjust the delivery of the multicast traffic based on several MBS related factors. It should be understood that the multicast mode is described in the example embodiments as one of the applicable scenarios, without the intention to limit the present disclosure. The method provided herein can be applied to the broadcast or any other forms of PTM transmission modes, whether currently known or developed in the future.

Figure 4:
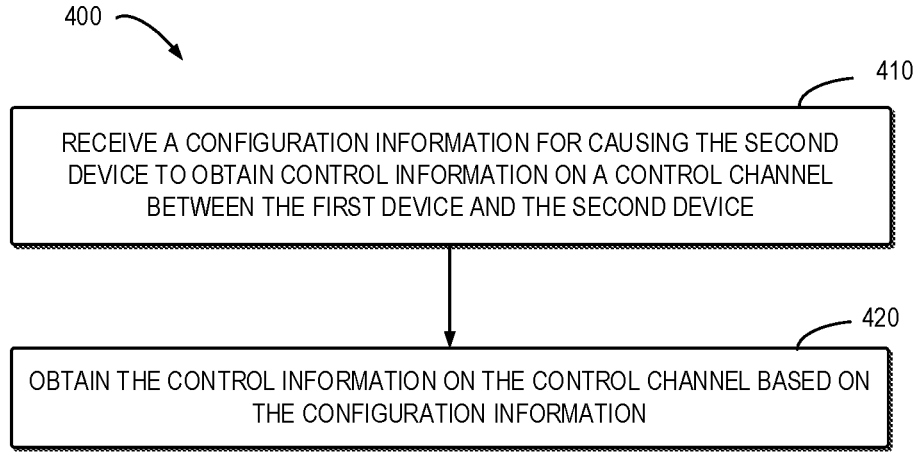
FIG. 4 illustrates a flowchart of a method of communication in accordance with some example embodiments of the present disclosure.

Correspondingly, embodiments of the present disclosure provide a method of communication implemented at the second device 120. FIG. 4 illustrates a flowchart of a method 400 of communication in accordance with some example embodiments of the present disclosure. The method 400 can be implemented at a terminal device, e.g., the second device 120 described with reference to FIG. 1. The method 400 may further involve the first device 110. It is to be understood that the method 400 may include additional acts not shown and/or may omit some acts as shown, and the scope of the present disclosure is not limited in this regard. In addition, it will be appreciated that, although primarily presented herein as being performed serially, at least a portion of the acts of the process 400 may be performed contemporaneously or in a different order than as presented in FIG. 4.

At 410, the second device 120 receives configuration information from the first device 110. The configuration information causes the second device 120 to obtain control information on a control channel between the first device 110 and the second device 120, for example, the PDCCH. The control information is related to scheduling multicast service traffic to the second device 120, for example, the DCI or the SIB.

In some example embodiments, the second device 120 may receive a first message indicating that a transmission scheme of the control information from the first device 110. The first message may indicate a first transmission scheme in which the control information is transmitted on an individual set of physical resources allocated for the second device 120, and the multicast service traffic is transmitted on a common set of physical resources allocated for the group of terminal devices 120 to 140.

In some example embodiments, the configuration information may be identifier priority information that indicates a prioritized identifier for obtaining the control information. The prioritized identifier may include one of a common identifier for identifying a group of terminal devices comprising the second device or a specific identifier for identifying the second device. For example, the common identifier may be the G-RNTI associated with the group of terminal devices 120 to 140, and the specific identifier may be the C-RNTI associated with the second device 120.

In some example embodiments, the identifier priority information may be included in the search space set configurations that are transmitted from the first device 110. By way of example, the identifier priority information may include a first bit, and the value of the first bit may indicate whether the common identifier (e.g., the G-RNTI) or the specific identifier (e.g., the C-RNTI) is prioritized for obtaining the control information.

In the above embodiments, the identifier priority information may further include a second bit, and the value of the second bit may indicates whether the common identifier or the specific identifier is prioritized for obtaining the multicast service traffic scheduled on the data channel between the first device 110 and the second device 120, which may be, for example, the PDSCH.

In some example embodiments, the second device 120 may receive the search space set configurations that include the identifier priority information in a set of slots indicating whether the common identifier or the specific identifier is prioritized for obtaining the control information. By way of example, if the second device 120 receives the search space set configurations in odd slots of a certain periodicity or duration, the second device 120 may determine that the common identifier (e.g., the G-RNTI) is prioritized for scrambling the DCI. Otherwise, if the second device 120 receives the search space set configurations in even slots of the certain periodicity or duration, the second device 120 may determine that the specific identifier (e.g., the C-RNTI) is prioritized for scrambling the DCI.

At 420, the second device 120 obtains the control information transmitted on the control channel based on the configuration information. The second device 120 may subsequently receive the multicast service traffic on the data channel between the first device and the second device, for example, the PDSCH, based on the configuration information and the control information.

It should be understood that the multicast mode is described in the example embodiments as one of the applicable scenarios, without the intention to limit the present disclosure. The method provided herein can be applied to the broadcast or any other forms of PTM transmission modes, whether currently known or developed in the future.

The method provided in the example embodiments of the present disclosure enables terminal devices to engage in only one form of blind detection for the search space set where the DCI related to multicast PDSCH can be scheduled on the PDCCH. As such, the complexity for the terminal devices to perform blind decoding for both G-RNTI and C-RNTI can be avoided.

In some example embodiments, a first apparatus capable of performing the method 300 may comprise means for performing the respective steps of the method 300. The means may be implemented in any suitable form. For example, the means may be implemented in a circuitry or software module.

In some example embodiments, the first apparatus comprises: means for determining a transmission scheme of control information for a second apparatus based on at least one multicast and broadcast service related criterion, the control information related to scheduling multicast service traffic to the second apparatus; means for transmitting, to the second apparatus, configuration information for causing the second apparatus to obtain the control information; and means for transmitting, to the second apparatus and based on the determined transmission scheme, the control information on a control channel between the first apparatus and the second apparatus.

In some example embodiments, the multicast and broadcast service related criterion comprises at least one of the following: a traffic load of the control channel; a uplink feedback configuration requirement; mobility conditions of the second device; a radio resource utilization of the control channel; or the number of a group of terminal devices comprising the second apparatus.

In some example embodiments, the means for determining the transmission scheme for the control information comprises: means for in accordance with a determination that a value of the multicast and broadcast service related criterion exceeds a threshold value of the multicast and broadcast service criterion preconfigured for the first apparatus, determining that the control information is to be transmitted on a common set of physical resources allocated for a group of terminal devices comprising the second apparatus; and means for in accordance with a determination that the value of the multicast and broadcast service related criterion does not exceed the threshold value of the multicast and broadcast service criterion, determining that the control information is to be transmitted on an individual set of physical resources allocated for the second apparatus.

In some example embodiments, the first apparatus further comprises means for in accordance with a determination that the transmission scheme is a first transmission scheme, transmitting a first message to the second device, the first message indicating that the control information is transmitted on an individual set of physical resources allocated for the second apparatus and the multicast service traffic is transmitted on a common set of physical resources allocated for a group of terminal devices comprising the second apparatus.

In some example embodiments, the means for transmitting the configuration information comprises: means for transmitting identifier priority information indicating a prioritized identifier for obtaining the control information, the prioritized identifier comprising one of a common identifier for identifying a group of terminal devices comprising the second apparatus or a specific identifier for identifying the second apparatus.

In some example embodiments, the identifier priority information comprises a first bit, a value of the first bit indicating whether the common identifier or the specific identifier is prioritized for obtaining the control information.

In some example embodiments, the identifier priority information further comprises a second bit, a value of the second bit indicating whether the common identifier or the specific identifier is prioritized for obtaining the multicast service traffic scheduled on a data channel between the first apparatus and the second apparatus.

In some example embodiments, the means for transmitting the identifier priority information comprises: means for transmitting, to the second apparatus, search space configurations comprising the identifier priority information.

In some example embodiments, the means for transmitting the search space configurations comprises: means for transmitting the search space configurations comprising the identifier priority information in a set of slots indicating whether the common identifier or the specific identifier is prioritized for obtaining the control information.

In some example embodiments, the means for transmitting the control information comprises: means for transmitting the control information in downlink control information.

In some example embodiments, the means for transmitting the control information comprises: means for transmitting, to a group of terminal devices comprising the second apparatus, the control information in a system information block.

In some example embodiments, the control information is transmitted in one of the following: an individual set of physical resources allocated for the second apparatus; or a common set of physical resources allocated for a group of terminal devices comprising the second apparatus.

In some example embodiments, the first apparatus further comprises: means for transmitting, to the second apparatus, the multicast service traffic on a data channel between the first apparatus and the second apparatus based on the control information and the configuration information.

In some example embodiments, the first apparatus is a network device and the second apparatus is a terminal device In some example embodiments, a second apparatus capable of performing the method 400 may comprise means for performing the respective steps of the method 400. The means may be implemented in any suitable form. For example, the means may be implemented in a circuitry or software module.

In some example embodiments, the second apparatus comprises: means for receiving, from a first apparatus, configuration information for causing the second apparatus to obtain control information on a control channel between the first apparatus and the second apparatus, the control information related to scheduling multicast service traffic to the second apparatus; and means for obtaining, from the first apparatus and based on the configuration information, the control information on the control channel.

In some example embodiments, the second apparatus further comprises means for receiving, from the first apparatus, a first message indicating that the control information is transmitted on an individual set of physical resources allocated for the second apparatus and the multicast service traffic is transmitted on a common set of physical resources allocated for a group of terminal devices comprising the second apparatus.

In some example embodiments, the means for receiving the configuration information comprises: means for receiving identifier priority information indicating a prioritized identifier for obtaining the control information, the prioritized identifier comprising one of a common identifier for identifying a group of terminal devices comprising the second apparatus or a specific identifier for identifying the second apparatus.

In some example embodiments, the identifier priority information comprises a first bit, a value of the first bit indicating whether the common identifier or the specific identifier is prioritized for obtaining the control information.

In some example embodiments, the identifier priority information further comprises a second bit, a value of the second bit indicating whether the common identifier or the specific identifier is prioritized for obtaining the multicast service traffic scheduled on a data channel between the first apparatus and the second apparatus.

In some example embodiments, the means for receiving the identifier priority information comprises: means for receiving, from the first apparatus, search space configurations comprising the identifier priority information.

In some example embodiments, the means for receiving the search space configurations comprises: means for receiving the search space configurations comprising the identifier priority information in a set of slots indicating whether the common identifier or the specific identifier is prioritized for obtaining the control information.

In some example embodiments, the means for receiving the control information comprises: means for receiving the control information in downlink control information.

In some example embodiments, the means for receiving the control information comprises: means for receiving the control information in a system information block.

In some example embodiments, the control information is received in one of the following: an individual set of physical resources allocated for the second apparatus; and a common set of physical resources allocated for a group of terminal devices comprising the second apparatus.

In some example embodiments, the second apparatus further comprises: means for receiving, based on the configuration information and the control information, the multicast service traffic on a data channel between the first apparatus and the second apparatus.

In some example embodiments, the first apparatus is a network device, and the second apparatus is a terminal device.

Figure 5:
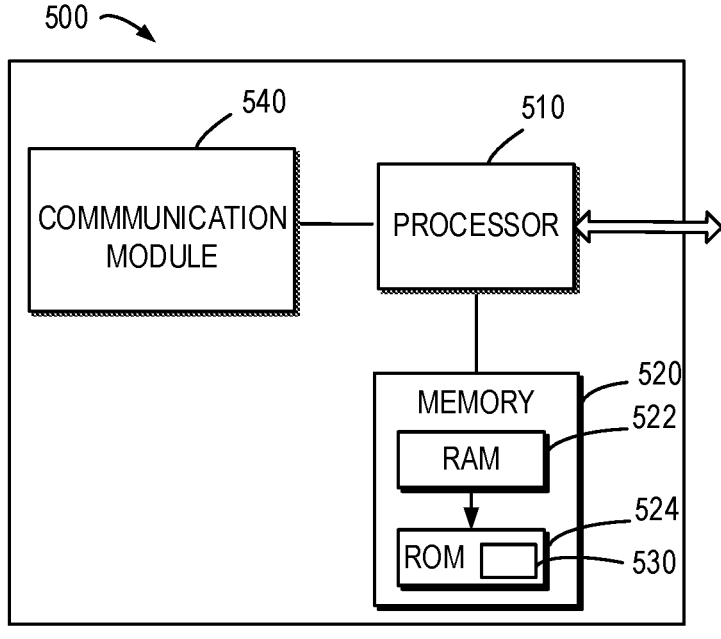
FIG. 5 illustrates a simplified block diagram of an apparatus that is suitable for implementing embodiments of the present disclosure.

FIG. 5 is a simplified block diagram of a device 500 that is suitable for implementing embodiments of the present disclosure. The device 500 may be provided to implement the communication device, for example the first device 110 and the second device 120, as shown in FIG. 1. As shown, the device 500 includes one or more processors 510, one or more memories 520 coupled to the processor 510, and one or more communication modules 540 coupled to the processor 510.

The communication module 540 is for bidirectional communications. The communication module 540 has at least one antenna to facilitate communication. The communication interface may represent any interface that is necessary for communication with other network elements.

The processor 510 may be of any type suitable to the local technical network and may include one or more of the following: general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

The memory 520 may include one or more non-volatile memories and one or more volatile memories. Examples of the non-volatile memories include, but are not limited to, a Read Only Memory (ROM) 524, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 522 and other volatile memories that will not last in the power-down duration.

A computer program 530 includes computer executable instructions that are executed by the associated processor 510. The program 530 may be stored in the ROM 520. The processor 510 may perform any suitable actions and processing by loading the program 530 into the RAM 520.

The embodiments of the present disclosure may be implemented by means of the program 530 so that the device 500 may perform any process of the disclosure as discussed with reference to FIGS. 3 and 4. The embodiments of the present disclosure may also be implemented by hardware or by a combination of software and hardware.

Figure 6:
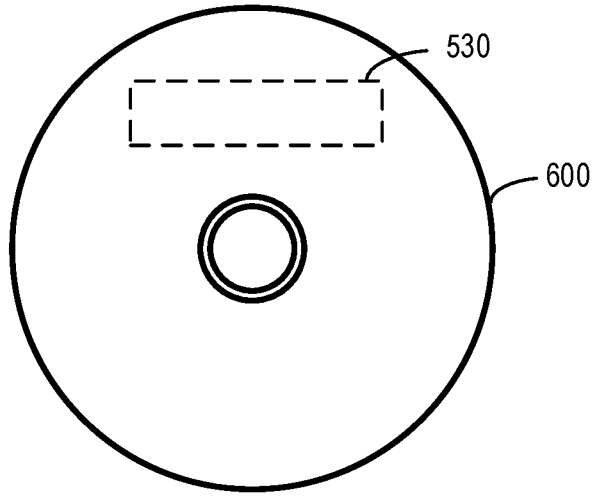
FIG. 6 illustrates a block diagram of an example computer readable medium in accordance with some embodiments of the present disclosure.

In some embodiments, the program 530 may be tangibly contained in a computer readable medium which may be included in the device 500 (such as in the memory 520) or other storage devices that are accessible by the device 500. The device 500 may load the program 530 from the computer readable medium to the RAM 522 for execution. The computer readable medium may include any types of tangible non-volatile storage, such as ROM, EPROM, a flash memory, a hard disk, CD, DVD, and the like. FIG. 6 shows an example of the computer readable medium 600 in form of CD or DVD. The computer readable medium has the program 530 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 300 or 400 as described above with reference to FIGS. 3-4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment.

Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus, comprising:

at least one processor; and at least one memory including computer program code;

wherein the at least one memory and the computer program code are configured to, with the at least one processor, cause the apparatus at least to:

determine a transmission scheme of control information based on at least one multicast and broadcast service related criterion, the control information is related to scheduling of multicast service traffic to a user equipment;

transmit, to the user equipment, configuration information for causing the user equipment to obtain the control information; and transmit, to the user equipment and based on the determined transmission scheme, the control information on a control channel between the apparatus and the user equipment, wherein the apparatus is caused to determine the transmission scheme for the control information by:

in accordance with a determination that a value of the multicast and broadcast service related criterion exceeds a threshold value of the multicast and broadcast service related criterion preconfigured for the apparatus, determining that the control information is to be transmitted on a common set of physical resources allocated for a group of terminal devices comprising the user equipment; and in accordance with a determination that the value of the multicast and broadcast service related criterion does not exceed the threshold value of the multicast and broadcast service related criterion, determining that the control information is to be transmitted on an individual set of physical resources allocated for the user equipment.

2. The apparatus of claim 1, wherein the multicast and broadcast service related criterion comprises at least one of the following:

a traffic load of the control channel;

a uplink feedback configuration requirement;

mobility conditions of the apparatus;

a radio resource utilization of the control channel; or the number of a group of terminal devices comprising the user equipment.

3. The apparatus of claim 1, wherein the apparatus is further caused to:

in accordance with a determination that the transmission scheme is a first transmission scheme, transmit a first message to the user equipment, the first message indicating that the control information is transmitted on an individual set of physical resources allocated for the user equipment and the multicast service traffic is transmitted on a common set of physical resources allocated for a group of terminal devices comprising the user equipment.

4. The apparatus of claim 1, wherein the apparatus is caused to transmit the configuration information for causing the user equipment to obtain the control information by:

transmitting identifier priority information indicating a prioritized identifier for obtaining the control information, the prioritized identifier comprising one of a common identifier for identifying a group of terminal devices comprising the user equipment or a specific identifier for identifying the user equipment.

5. The apparatus of claim 4, wherein the identifier priority information comprises a first bit, a value of the first bit indicating whether the common identifier or the specific identifier is prioritized for obtaining the control information.

6. The apparatus of claim 5, wherein the identifier priority information further comprises a second bit, a value of the second bit indicating whether the common identifier or the specific identifier is prioritized for obtaining the multicast service traffic scheduled on a data channel between the apparatus and the user equipment.

7. The apparatus of claim 4, wherein the apparatus is caused to transmit the identifier priority information by:

transmitting, to the user equipment, search space configurations comprising the identifier priority information.

8. The apparatus of claim 7, wherein the apparatus is caused to transmit the search space configurations by:

transmitting the search space configurations comprising the identifier priority information in a set of slots indicating whether the common identifier or the specific identifier is prioritized for obtaining the control information.

9. The apparatus of claim 1, wherein the apparatus is caused to transmit the control information by:

transmitting the control information in downlink control information, or transmitting, to a group of terminal devices comprising the apparatus, the control information in a system information block.

10. The apparatus of claim 1, wherein the apparatus is caused to transmit the control information in one of the following:

an individual set of physical resources allocated for the user equipment; or a common set of physical resources allocated for a group of terminal devices comprising the user equipment.

11. A user equipment, comprising:

at least one processor; and at least one memory including computer program code;

wherein the at least one memory and the computer program code are configured to, with the at least one processor, cause the user equipment at least to:

receive, from a network device, a configuration information associated with a control information, wherein the control information is related to scheduling of multicast service traffic to the user equipment and the configuration information comprises identifier priority information indicating a prioritized identifier for obtaining the control information; and obtain, based on the configuration information and a transmission scheme, the control information on a control channel between the user equipment and the network device, wherein the transmission scheme is associated with at least one multicast and broadcast service related criterion, wherein the transmission scheme for the control information is received from the network device and is based on:

a determination that a value of the multicast and broadcast service related criterion exceeds a threshold value of the multicast and broadcast service related criterion preconfigured for the apparatus and that the control information is to be transmitted on a common set of physical resources allocated for a group of terminal devices comprising the user equipment; and a determination that the value of the multicast and broadcast service related criterion does not exceed the threshold value of the multicast and broadcast service related criterion and that the control information is to be transmitted on an individual set of physical resources allocated for the user equipment.

12. The user equipment of claim 11, wherein the user equipment is further caused to:

receive, from the network device, a first message indicating that the control information is transmitted on an individual set of physical resources allocated for the user equipment and the multicast service traffic is transmitted on a common set of physical resources allocated for a group of terminal devices comprising the user equipment, wherein the first message is received in radio resource control (RRC) signaling.

13. The user equipment of claim 11, wherein the user equipment is caused to receive the configuration information by:

receiving identifier priority information indicating a prioritized identifier for obtaining the control information, the prioritized identifier comprising one of a common identifier for identifying a group of terminal devices comprising the user equipment or a specific identifier for identifying the user equipment, wherein the common identifier comprises a group radio network temporary identifier (G-RNTI) and the specific identifier comprises a cell radio network temporary identifier (C-RNTI).

14. The user equipment of claim 13, wherein the identifier priority information comprises a first bit, a value of the first bit indicating whether the common identifier or the specific identifier is prioritized for obtaining the control information, wherein a value of the first bit set to 0 indicates prioritization of the group identifier and a value of the first bit set to 1 indicates prioritization of the specific identifier.

15. The user equipment of claim 14, wherein the identifier priority information further comprises a second bit, a value of the second bit indicating whether the common identifier or the specific identifier is prioritized for obtaining the multicast service traffic scheduled on a data channel between the user equipment and the network device, wherein a value of the second bit set to 0 indicates use of the group identifier for scrambling of the PDSCH, and a value of the second bit set to 1 indicates use of the specific identifier for scrambling of the PDSCH.

16. The user equipment of claim 13, wherein the user equipment is caused to receive the identifier priority information by:

receiving, from the network device, search space configurations comprising the identifier priority information, wherein the search space configurations are transmitted in odd slots indicating prioritization of the group identifier and in even slots indicating prioritization of the specific identifier, and wherein the multicast and broadcast service related criterion comprises at least the following:

a traffic load of the control channel;

an uplink feedback configuration requirement;

mobility conditions of the network device; and a radio resource utilization of the control channel.

17. The user equipment of claim 11, wherein the user equipment is further caused to receive the control information in:

a common set of physical resources allocated for a group of terminal devices comprising the user equipment, wherein the control information is received in downlink control information or in a system information block.

18. The user equipment of claim 11, wherein the user equipment is further caused to:

receive, from the network device, configuration information based on at least one multicast and broadcast service related criterion comprising a number of terminal devices in a group comprising the user equipment, the configuration information including an indication of whether the control information is transmitted on a common set of physical resources allocated for the group or on an individual set of physical resources allocated for the user equipment.

19. A method comprising:

receiving, from a network device and at a user equipment, a configuration information associated with a control information, wherein the control information is related to scheduling of multicast service traffic to the user equipment and the configuration information comprises identifier priority information indicating a prioritized identifier for obtaining the control information; and obtaining, based on the configuration information and a transmission scheme, the control information on a control channel between the user equipment and the network device, wherein the transmission scheme is associated with at least one multicast and broadcast service related criterion, wherein the transmission scheme for the control information is received from the network device and is based on:

a determination that a value of the multicast and broadcast service related criterion exceeds a threshold value of the multicast and broadcast service related criterion preconfigured for the apparatus and that the control information is to be transmitted on a common set of physical resources allocated for a group of terminal devices comprising the user equipment; and a determination that the value of the multicast and broadcast service related criterion does not exceed the threshold value of the multicast and broadcast service related criterion and that the control information is to be transmitted on an individual set of physical resources allocated for the user equipment.

20. A method, comprising:

determining, by a network device, a transmission scheme of control information based on at least one multicast and broadcast service related criterion, the control information is related to scheduling of multicast service traffic to a user equipment;

transmitting, to the user equipment, configuration information for causing the user equipment to obtain the control information; and transmitting, to the user equipment and based on the determined transmission scheme, the control information on a control channel between the apparatus and the user equipment, wherein determining the transmission scheme for the control information comprises:

in accordance with a determination that a value of the multicast and broadcast service related criterion exceeds a threshold value of the multicast and broadcast service related criterion preconfigured for the apparatus, determining that the control information is to be transmitted on a common set of physical resources allocated for a group of terminal devices comprising the user equipment; and in accordance with a determination that the value of the multicast and broadcast service related criterion does not exceed the threshold value of the multicast and broadcast service related criterion, determining that the control information is to be transmitted on an individual set of physical resources allocated for the user equipment.

* * * * *